Patented Sept. 22, 1925.

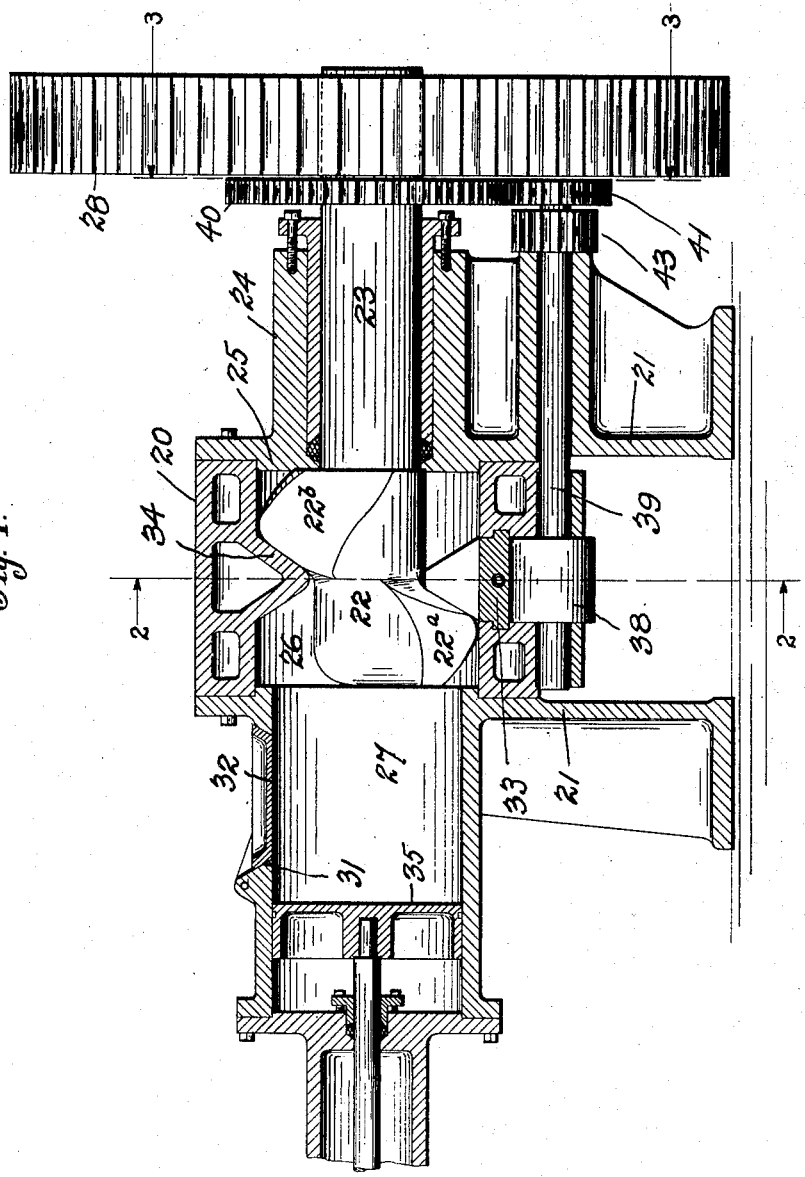

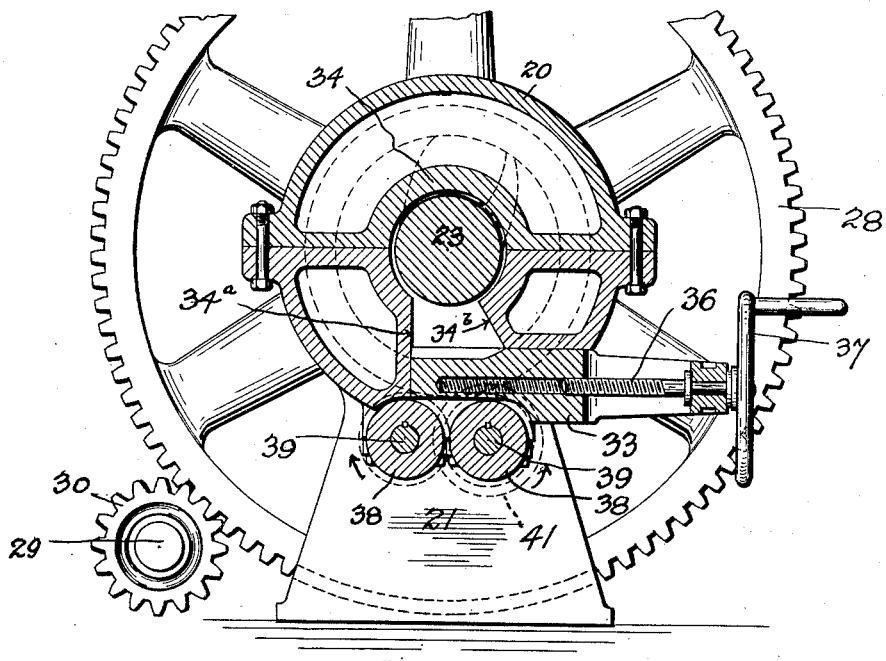
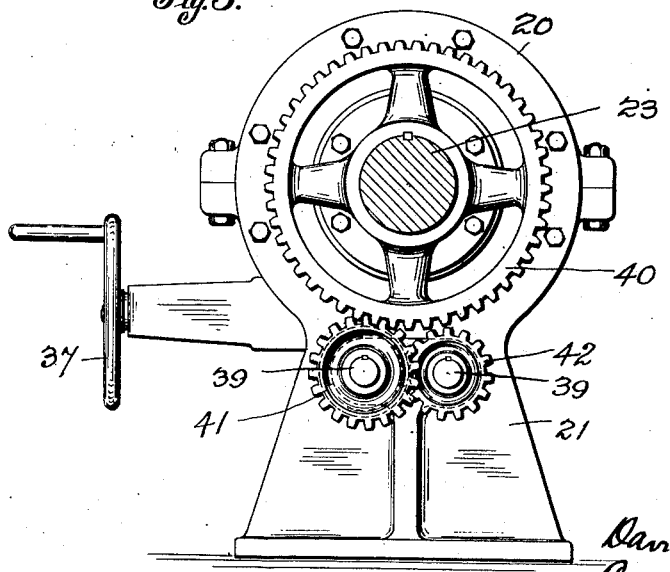

1,554,706

UNITED STATES PATENT OFFICE.

DAVID R. BOWEN AND CARL F. SCHNUCK, OF ANSONIA, CONNECTICUT, ASSIGNORS TO FARREL FOUNDRY & MACHINE COMPANY, OF ANSONIA, CONNECTICUT, A CORPORATION OF CONNECTICUT.

MACHINE FOR TREATING RUBBER AND SIMILAR MATERIAL.

Application filed June 10, 1918, Serial No. 239,163. Renewed April 22, 1922. Serial No. 556,128.

*To all whom it may concern:*

Be it known that we, DAVID R. BOWEN and CARL F. SCHNUCK, both citizens of the United States, and both residing in Ansonia, county of New Haven, and State of Connecticut, have invented certain new and useful Improvements in Machines for Treating Rubber and Similar Material, of which the following is a full, clear, and exact description.

This invention pertains to rubber mixers and like machines, and it has particular reference to machines for mixing rubber, usually in the form of fairly large chunks, with filling or coloring material in powdered form, such as lamp black, for example, with the object of producing a smooth, plastic mass in which the distribution of the ingredients is as nearly uniform as possible. A machine of this general type is disclosed in our application Serial No. 208,635, the mixing being obtained by working a batch of material back and forth in a mixing or working chamber through an intermediately located extrusion space. In the machine shown in the prior application, the batch of material is fed into the working chamber at one end of the latter and discharge of the machine is effected by opening the intermediate lower part of the casing or working chamber so that the mixed batch will fall out by gravity or can be pulled out as the fragments are stripped off against the extrusion rib.

The present improvements relate more especially to the means for discharging the batch from the working chamber.

One of the primary objects of this invention is to provide a rubber mixer or like machine having provision for sheeting the rubber previous to its complete discharge from the machine. This obviates the necessity of a separate sheeting operation in another machine, which has heretofore been the usual procedure, it being common practice to discharge the batch from the mixer in lumps or fragments and then to transfer them to a separate machine provided with rolls which thin out the material and convert it into one or more continuous sheets. In this form it can, of course, be readily handled and maripulated. Further, in compounding rubber, the heat generated by the friction in the working chamber is so great that the mass will attain a rather high temperature by the time the mixing operation is completed, and if it is not suitably cooled, vulcanization of the inner parts is apt to occur. By converting the mass into one or more thin sheets, the air is enabled to contact with it over a very large surface, so as to exert a cooling action thereon that will prevent vulcanization. Where a separate sheeting machine is employed, some time is lost, or is apt to be lost, in transferring the fragments of mixed rubber to the sheeting rolls; but in the practice of our invention the rubber is sheeted and cooled immediately on and during discharge from the mixing chamber, and the possibility of vulcanization taking place is reduced to that extent.

Another object of our invention is to provide a machine of the type set forth, in which the sheeting rolls are used as a means for discharging effectively the mixing chamber of the machine.

Another object of the invention is to furnish a machine of the type indicated, in which the mixing chamber is discharged by an outward pulling action exerted by suitable rolls, which grip the material between them as the material is fed to said rolls by gravity or otherwise.

Other objects of our invention are to provide a rubber mixing machine which discharges the mixed batch in the form of a sheet; to furnish a sheeting device to which the material is fed directly from a mixer by mechanical means, thereby doing away with the charging of the sheeting device by hand; to provide a combined mixing and rolling machine of very simple, compact form; and to improve generally and in detail the construction and operation of machines of the general type indicated.

To these and other ends, the invention consists in the novel features and combinations of parts to be hereinafter described and claimed.

In the drawings,

Fig. 1 is a vertical longitudinal section of a machine embodying our improvements.

Fig. 2 is a section on line 2—2 of Fig. 1.

Fig. 3 is a section on line 3—3 of Fig. 1.

We have shown our improvements applied to a rubber mixer which is very similar in its general outlines to that disclosed in our previous application Serial No. 208,635, but it will be understood from the following description that the type of the mixer device may be very considerably varied.

In the embodiment shown, a casing 20 of generally cylindrical shape, horizontally arranged, is supported by legs or end frames 21 standing on the floor. In the casing is a rotary mixing element 22, hereinafter referred to as the rotor, having a shaft 23 with a long bearing in a bushing 24 carried by a cylinder head 25, which, in this instance, is cast as an integral part of one of the end frames. The casing is divided transversely into a main working or mixing chamber 26 and a charging or feed chamber 27, said chambers being both of approximately cylindrical shape and arranged end to end in free communication with each other. The rotor 22 may be rotated by power applied to a gear wheel 28 from a shaft 29 having a pinion 30 meshing with said gear wheel, as shown in Fig. 2. The feed chamber is provided at the top with a charging opening 31 controlled by a door 32, and the working chamber is provided at its lower intermediate portion with a sliding discharge closure 33 which is opened for the downward discharge of the material after the latter has been properly mixed.

It will be observed that the side wall of the working chamber is water jacketed for the circulation of cooling water, and the rotor will in practice be similarly cooled, although its hollow construction is not shown in the drawings. The working chamber is provided intermediate of its ends with a transverse extrusion rib 34 which is of substantially V-shaped cross-section and cooperates with the rotor 22 in the manner described in our prior application. The rotor 22 has a mixing blade 22$^a$ at one side of the extrusion rib, and another mixing blade 22$^b$ at the other side of the rib. When the material has been forced into the working chamber 26 from the charging chamber 27 by a charging device 35 in said charging chamber, as described in our prior application, it is carried around and smeared against the inner cylindrical surface of the chamber and worked back and forth in a generally longitudinal direction in the working chamber, so as to be forced back and forth over the rib 34 and through the restricted extrusion space which is provided between the inner part of the rib and the adjacent part of the rotor. At the same time that one of the blades is forcing the material out of one end of the working chamber and through the extrusion space into the other chamber end, a blade in such other chamber end is forcing the material into the first mentioned end of the cylinder, so that the material in the working cylinder, in being forced past the rib alternately in opposite directions, is soon reduced to a homogeneous, plastic mass, in which the powdered filling or coloring material is thoroughly and uniformly incorporated.

The discharge closure 33 is illustrated as being in the nature of a slide block which has a transverse sliding movement relatively to the working chamber for moving said block into and out of the operative position, the block being moved in and out by a threaded spindle 36 having a hand wheel 37. The closed position of the slide block is shown in Fig. 2.

Beneath the slide block and in line with the discharge opening controlled thereby is a pair of sheeting rolls 38 which sheet the mixed material prior to its discharge from the machine. These rolls receive the material direct from the mixing chamber when the mixing operation has been completed and the slide block or other closure is moved to the open position. In the form shown, the sheeting rolls 38 are fixed to horizontal shafts 39 disposed lengthwise of the machine at the lower part thereof and having suitable bearings in the machine frame. Provision is also made for rotating the sheeting rolls positively, preferably from the main drive shaft, and to this end the main drive shaft 23 has keyed thereto a large gear 40 meshing with a small gear 41 on the right-hand end of that shaft 39 which is located at the front of the machine. In this manner the front roll shaft is rotated positively and the other roll shaft is rotated in the opposite direction by a pinion 42 on such other roll shaft, meshing with a pinion 43 on the front roll shaft. It will be understood, therefore, that the rolls 38 will be rotated in opposite directions as long as the mixing device is in motion.

The operation of the machine is substantially as follows: The door 32 being in the open position, the lumps of rubber and the powdered coloring material or the like are dumped into the feed chamber. The rotor 22 is in constant rotation. The feed chamber having been charged and the discharge valve or block 33 being in the closed position, the plunger or feed device 35 is moved to the right with reference to Fig. 2 for the purpose of charging the batch into the working chamber. The plunger 35 forces the material into the mixing chamber while the blades 22$^a$ and 22$^b$ are rotating. As the plunger moves to the right (Fig. 1) it passes over the charging opening 31, and when the plunger has been moved almost into contact with the left-hand end of the rotor, its motion is arrested by suitable means and it is maintained substantially in that position throughout the mixing operation, so as to hold the material in the working chamber and subject it to pressure therein. When the mixing has continued for such a length of time that the batch is of the desired homogeneity and consistency, the block 33 is moved outward by manipulation of the hand wheel 37, so as to permit the discharge of the machine from the bottom at a point in line with the extrusion rib, the ends of which (34$^a$ and 34$^b$) act as strippers during this operation. The block 33 being in the open position so as to relieve the pressure in the working chamber, comparatively large fragments of the mixed material are thrown downward into the sheeting rolls by centrifugal force, after being stripped off the rotor by the ends of the extrusion rib, and this material will be gripped by the sheeting rolls and will be discharged from the machine in the form of a practically continuous sheet. The sheeting rolls should, of course, be so spaced as to produce a sheet of the required thinness to permit the necessary cooling of the mass by the air and prevent vulcanization of any of the interior parts of the batch, owing to the continuance of the heat existing in the mass as a result of the mixing.

It will be obvious that, once the discharging material has been gripped by the sheeting rolls, it will be positively pulled out of the machine by said rolls. The sheeting rolls, therefore, act as a discharge device for the mixing chamber, owing to the fact that the material is discharged from said chamber in a downward direction and naturally falls or comes into contact with and is gripped by the sheeting rolls. At the same time, the mixing device serves as a feeder for the sheeting device, so that no hand feeding of the latter is necessary, the transmission of the batch from the mixing chamber to the sheeting rolls being very direct. By the construction described, a mixing device and a sheeting device are both combined in a very simple and efficient manner in a single machine, and the construction and operation of a separate machine for sheeting the mixed material will be obviated in many cases.

Various changes may be made in the details of the machine structure without departing from the scope of our invention as defined in the claims. For example, it will be obvious that we do not limit ourselves in all aspects of the invention to a machine in which the mixing is produced by an extrusion process, as modification in this and other respects may be made without digressing from the broad inventive idea.

We do not claim broadly herein a rubber working machine comprising a hollow body having an interior substantially cylindrical chamber, a rotor mounted within the chamber, and provided with means for working the material back and forth in the chamber and smearing it against the inner surface of the chamber wall, and means providing a bottom discharge for the chamber, as claimed in our application, Serial No. 458,222.

What we claim is:

1. In a machine of the character described, the combination of a casing having a mixing chamber, a horizontal rotor in said chamber having one or more blades for working the material against the interior surface of the chamber wall, said chamber being provided at its lower part with a discharge opening, means associated with said opening for exerting a downward pulling action on the material in the chamber for the purpose of discharging the same.

2. In a machine of the character described, a casing provided with an interior mixing chamber, a horizontal rotor in said chamber having a blade for working the material against the inner surface of the chamber wall, to thereby mix such material, said chamber provided with a discharge opening at its lower part, and a pair of rolls outside of the chamber adjacent said opening, in close relation thereto for discharging and sheeting the mixed material.

3. In a machine for treating rubber, the combination of a mixing chamber, a rotary mixing element therein, said chamber having a discharge opening, means adjacent said discharge opening for stripping material from said rotary element, and a pair of sheeting rolls outside of the chamber adjacent said discharge opening, adapted to receive the stripped-off material.

4. A rubber compounding machine, having a mixing chamber and means for drawing the compounded material therefrom and discharging it in sheet form.

5. In a device of the character described, a mixing chamber provided with a discharge opening, a closure for said opening and a roller device for gripping the material and drawing it from the chamber through said opening and discharging it in sheet form.

6. In a device of the character described, a mixing chamber provided with a discharge opening, a pair of sheeting rolls arranged closely adjacent said opening to grip the material emerging from the opening and draw the charge from the chamber.

7. In a device of the character described, the combination of a casing having a mixing chamber, a horizontal rotor in said chamber having blades for working the material against the interior surface of the chamber wall, said chamber being provided with a discharge opening at its lower part and a pair of sheeting rolls arranged closely adjacent said opening to catch the material and draw it from the chamber and discharge it in sheet form.

8. A rubber compounding machine, having a mixing chamber provided with a downwardly facing discharge opening and sheeting rolls arranged closely adjacent said opening to exert a downward pulling action on the material in the chamber and discharge it in sheet form.

9. A rubber masticating machine, including a chamber in which the material is treated, said chamber being provided with a discharge opening, a rolling device arranged immediately adjacent the mouth of said opening to grip the material in the chamber and exert a downward pulling action thereon to effect the discharge thereof.

10. A rubber masticating machine, including a chamber in which the material is treated, said chamber being provided with a discharge opening, means comprising a pair of positively driven rollers arranged immediately adjacent the mouth of said opening to grip the material in the chamber and exert a downward pulling action thereon to effect the discharge thereof.

11. The combination of a rubber mixer, comprising a chamber provided with a discharge opening, a closure for said opening arranged to move transversely of the chamber axis, and sheeting rolls to receive the material discharged from said chamber.

12. A rubber mixer, comprising a chamber provided with an intermediate extrusion rib, a rotor to move the material from one end of the chamber to the other past the said rib, a discharge opening, a closure to close said opening mounted in the plane of said rib, and sheeting rolls arranged in position to receive material through the opening and discharge it in sheet form.

13. A rubber mixing machine, comprising a chamber provided with a circumferential extrusion rib arranged intermediate its ends, said chamber being provided with a lower discharge opening and a closure therefor, in line with the rib, and substantially co-extensive in width therewith, and a sheeting device arranged below the rib to receive material through said opening and discharge it in sheet form.

14. A rubber mixing machine, comprising a cylindrical chamber, provided with a circumferential extrusion rib arranged intermediate its ends, a rotor to move the material back and forth in said chamber, a sliding door arranged at the lower part of the chamber in line with said rib and adapted to move transversely of the chamber axis, said chamber having an opening through the wall thereof adapted to be closed by said door, sheeting rolls arranged below the chamber to receive material therefrom, and means for stripping the material off the rotor to discharge it upon the sheeting rolls.

15. A rubber working machine having a chamber consisting of a substantially complete single cylinder, a rotor mounted within the chamber and provided with means for working the material back and forth therein and smearing it against the chamber wall, said chamber being provided with a bottom discharge opening and a sliding closure member to control the discharge of the chamber through said opening.

16. A rubber working machine comprising a hollow body having an interior substantially complete cylindrical chamber, a rotor mounted within the chamber and provided with means for working the material back and forth therein, and smearing it against the chamber wall, said chamber being provided with a discharge opening and a sliding closure member to control said opening.

17. A rubber working machine having a chamber consisting of a single cylinder, means for working the material back and forth therein while smearing it against the wall thereof, means providing at the lower portion of the cylinder an opening through which the material may drop to discharge the mass, and a sliding closure member to control the discharge through said opening.

18. A rubber working machine having a working chamber bounded by a substantially complete cylindrical wall, and a rotor having blades for working the material back and forth therein and around the wall thereof, the cylindrical wall confining the rotor on all sides thereof, means providing an opening through the wall to effect the discharge of the material, and a sliding closure member to close said opening.

19. A machine for compounding rubber, having a mixing chamber in the form of a single cylinder, a bladed rotor in said cylinder confined on all sides thereby, said rotor being constructed and arranged to work the material against and around the cylinder circumference by a smearing action while shifting different portions of the material lengthwise in opposite directions, means providing a discharge opening in said cylinder at the lower portion thereof, and a sliding closure member to control said opening.

20. A machine for mixing rubber and similar materials, comprising a substantially cylindrical mixing chamber and a relatively rotary member located therein, said chamber and member being adapted by their relative rotation to propel the materials continuously and alternately from the ends of the chamber toward and past the center thereof, and simultaneously to impart to the materials a circumferential movement about the inner peripheral surface of the chamber, means providing a discharge opening for the chamber and a sliding closure to control the discharge of materials through said opening.

In witness whereof, we have hereunto set our hands on the 5th day of June, 1918.

DAVID R. BOWEN.
CARL F. SCHNUCK.